(12) United States Patent
Deng

(10) Patent No.: US 9,819,270 B2
(45) Date of Patent: Nov. 14, 2017

(54) SWITCHING POWER CONVERTER, CONTROL CIRCUIT AND INTEGRATED CIRCUIT THEREFOR, AND CONSTANT-CURRENT CONTROL METHOD

(71) Applicant: Silergy Semiconductor Technology (Hangzhou) Ltd., Hangzhou (CN)

(72) Inventor: Fuhua Deng, Hangzhou (CN)

(73) Assignee: SILERGY SEMICONDUCTOR TECHNOLOGY (HANGZHOU) LTD., Hangzhou (CN)

( * ) Notice: Subject to any disclaimer, the term of this patent is extended or adjusted under 35 U.S.C. 154(b) by 0 days.

(21) Appl. No.: 15/016,905

(22) Filed: Feb. 5, 2016

(65) Prior Publication Data

US 2016/0261187 A1 Sep. 8, 2016

(30) Foreign Application Priority Data

Feb. 6, 2015 (CN) .......................... 2015 1 0065108

(51) Int. Cl.
*H02M 3/158* (2006.01)
*H02M 1/00* (2006.01)

(52) U.S. Cl.
CPC .. *H02M 3/1588* (2013.01); *H02M 2001/0009* (2013.01); *Y02B 70/1466* (2013.01)

(58) Field of Classification Search
CPC .... H02M 3/156; H02M 3/158; H02M 3/1582; H02M 3/1588; H02M 1/08;
(Continued)

(56) References Cited

U.S. PATENT DOCUMENTS 8,482,271 B2 * 7/2013 Prodic ................. H02M 3/1588
  323/283
9,525,350 B2 * 12/2016 Hari ........................ H02M 1/15
(Continued)

FOREIGN PATENT DOCUMENTS

CN 102904305 A 1/2013
CN 103840664 A 6/2014
(Continued)

OTHER PUBLICATIONS

Office Action, including Search Report, for Chinese Patent Application No. 201510065108.3, dated May 5, 2016, 8 pages.

*Primary Examiner* — Matthew Nguyen
(74) *Attorney, Agent, or Firm* — Westman, Champlin & Koehler, P.A.

(57) ABSTRACT

The present disclosure relates to a switching power converter, a control circuit and an integrated circuit therefor, and a constant-current control method. The control circuit samples a valley value of an electric current through a first power transistor in a power stage circuit and a peak value of an electric current through a second power transistor in the power stage circuit, and obtains parameters representing an output current in accordance with an average value of the valley value and peak value. Thus, the constant-current control can be performed by sampling the electric current through the first power transistor and the second power transistor. Moreover, the switching power converter simplifies a current feedback loop for outputting a constant current, and the integrated circuit has fewer pins.

11 Claims, 5 Drawing Sheets

(58) Field of Classification Search
CPC ... H02M 2001/0009; H02M 2003/145; H02M 2003/158
See application file for complete search history.

(56) References Cited

U.S. PATENT DOCUMENTS

| | | | | |
|---|---|---|---|---|
| 2011/0018515 A1* | 1/2011 | McCloy-Stevens | | H02M 3/1588 323/284 |
| 2011/0199048 A1 | 8/2011 | Yokoyama et al. | | |
| 2014/0016384 A1* | 1/2014 | Sun | ............. | H02M 3/158 363/124 |

FOREIGN PATENT DOCUMENTS

| | | |
|---|---|---|
| CN | 104009529 A | 8/2014 |
| CN | 104065119 A | 9/2014 |
| CN | 104104228 A | 10/2014 |
| CN | 104143850 A | 11/2014 |
| CN | 104185350 A | 12/2014 |
| CN | 104467427 A | 3/2015 |

* cited by examiner

SWITCHING POWER CONVERTER, CONTROL CIRCUIT AND INTEGRATED CIRCUIT THEREFOR, AND CONSTANT-CURRENT CONTROL METHOD

CLAIM OF PRIORITY

This application claims priority to Chinese Application No. 201510065108.3, filed on Feb. 6, 2015, which is hereby incorporated by reference.

BACKGROUND OF THE DISCLOSURE

Field of the Disclosure

The present disclosure relates to power electronics, and more particularly, to a control circuit, an integrated circuit, a switching power converter and a constant-current control method.

Description of the Related Art

Rechargeable batteries are widely used in various electronic equipment, typically needing a constant current for charging. The switching power converter having a constant current output may be used for charging the rechargeable batteries. In order to control the switching power converter to provide a constant current, it is necessary to sample a charging current or parameters relevant to the same.

A conventional switching power converter has an inductor being coupled in series with a sampling resistor, as shown in FIG. 1. As a result, a sampling resistor may have a large resistance necessary for sampling. More pins are required when the control circuit integrated in an integrated circuit.

BRIEF DESCRIPTION OF THE DISCLOSURE

In view of this, one objective of the disclosure is to provide a control circuit, an integrated circuit, a switching power converter and a constant-current control method. The switching power converter including the control circuit simplifies a current feedback loop for outputting a constant current, and the integrated circuit including the control circuit has fewer pins.

According to a first aspect of the disclosure, there is provided a control circuit configured to control a power stage circuit comprising a first power transistor, a second power transistor and an inductor, comprising:

a valley-value obtaining circuit configured to obtain a first voltage representing a valley value of an electric current through the first power transistor;

a peak-value obtaining circuit configured to obtain a second voltage representing a peak value of an electric current through the second power transistor;

a compensation signal generating circuit configured to generate a compensation signal representing a difference between a desirable inductor current and an average value of a peak value and a valley value of an inductor current in accordance with the first voltage, the second voltage and a reference voltage; and a control signal generating circuit configured to generate a first control signal for controlling the first power transistor and a second control signal for controlling the second power transistor in accordance with the compensation signal.

Preferably, the first voltage is in a first proportion to the valley value of the electric current through the first power transistor, and the second voltage is in a second proportion to the peak value of the electric current through the second power transistor, and the first proportion and the second proportion have a positive value and a negative value respectively, but have the same absolute value;

the compensation signal generating circuit generates a signal proportional to $Vref-(V1-V2)/2$ as the compensation signal, in which Vref is the reference voltage, V1 is the first voltage and V2 is the second voltage.

Preferably, the valley-value obtaining circuit comprises:

a first current detection circuit configured to detect the electric current through the first power transistor and to provide a first current detection signal which is in the first proportion to the electric current through the first power transistor;

a first sampling circuit configured to sample the first current detection signal in accordance with the first control signal or the second control signal and to provide the first voltage;

the peak-value obtaining circuit comprises:

a second current detection circuit configured to detect the electric current through the second power transistor and to provide a second current detection signal which is in the second proportion to the electric current through the second power transistor;

a second sampling circuit configured to sample the second current detection signal in accordance with the first control signal or the second control signal and to provide the second voltage.

Preferably, the first sampling circuit comprises:

a first single-trigger circuit configured to provide a first single-trigger signal in a case that the first control signal changes from an inactive level to an active level or in a case that the second control signal changes from an active level to an inactive level;

a first switch and a first resistor, which are electrically coupled in series between the first current detection circuit and an output terminal of the first voltage, in which the first switch is turned on in accordance with the first single-trigger signal; and a first capacitor being electrically coupled between an output terminal of the first signal and ground, and being configured to maintain the first voltage;

the second sampling circuit comprises:

a second single-trigger circuit configured to provide a second single-trigger signal in a case that the first control signal changes from an active level to an inactive level or in a case that the second control signal changes from an inactive level to an active level;

a second switch and a second resistor, which are electrically coupled in series between the second current detection circuit and an output terminal of the second voltage, in which the second switch is turned on in accordance with the second single-trigger signal; and a second capacitor being electrically coupled between an output terminal of the second signal and ground, and being configured to maintain the second voltage.

Preferably, the first current detection circuit comprises:

a third resistor and a third switch, which are electrically coupled in series between a first terminal and a second terminal of the first power transistor, and the third switch and the first power transistor being turned on or off simultaneously; and a voltage-drop obtaining circuit configured to sample and output a voltage across the third resistor as the first current detection signal;

the second current detection circuit comprises:

a fourth resistor and a fourth switch, which are electrically coupled in series between a first terminal and a second terminal of the second power transistor, and the fourth switch and the second power transistor being turned on or off simultaneously.

Preferably, the compensation signal generating circuit comprises:

an error amplifier configured to receive the first voltage and the second voltage, and to provide a third voltage representing an average value of a peak value and a valley value of an inductor current; and a transconductance amplifier configured to receive the reference voltage and the third voltage, and to provide the compensation signal.

Preferably, the compensation signal generating circuit comprises:

an error amplifier configured to receive the reference voltage and the first voltage, and to provide a fourth voltage;

an adder configured to receive the reference voltage and the second voltage, and to provide a fifth voltage; and a transconductance amplifier configured to receive the fourth voltage and the fifth voltage, and to provide the compensation signal.

According to a second aspect of the disclosure, there is provided an integrated circuit, comprising:

a first power transistor;

a second power transistor; and a control circuit as mentioned above and being configured to control the first power transistor and the second power transistor.

According to a third aspect of the disclosure, there is provided a switching power converter, comprising:

a power stage circuit comprising a first power transistor, a second power transistor and an inductor; and a control circuit as mentioned above, and configured to control the power stage circuit.

According to a fourth aspect of the disclosure, there is provided a constant-current control method for controlling a power stage circuit comprising a first power transistor, a second power transistor and an inductor, comprising:

obtaining a first voltage representing a valley value of an electric current through the first power transistor, and a second voltage representing a peak value of an electric current through the second power transistor;

generating a compensation signal representing a difference between a desirable inductor current and an average value of a peak value and a valley value of an inductor current in accordance with the first voltage, the second voltage and a reference voltage;

generating a first control signal for controlling the first power transistor and a second control signal for controlling the second power transistor in accordance with the compensation signal.

Preferably, the first voltage is in a first proportion to the valley value of the electric current through the first power transistor, and the second voltage is in a second proportion to the peak value of the electric current through the second power transistor, and the first proportion and the second proportion have a positive value and a negative value respectively, but have the same absolute value;

the step of generating the compensation signal in accordance with the first voltage, the second voltage and the reference voltage comprises generating a signal proportional to Vref−(V1−V2)/2 as the compensation signal, in which Vref is the reference voltage, V1 is the first voltage and V2 is the second voltage.

The control circuit samples a valley value of an electric current through the first power transistor in the power stage circuit and a peak value of an electric current through the second power transistor in the power stage circuit, and obtains parameters representing an output current in accordance with the average value of the valley value and peak value. Thus, the constant-current control can be performed by sampling electric current through the first power transistor and the second power transistor. Moreover, the switching power converter simplifies a current feedback loop for outputting a constant current, and the integrated circuit has fewer pins.

BRIEF DESCRIPTION OF THE DRAWINGS

The above and other objects, advantages and features of the present invention will become more fully understood from the detailed description given hereinbelow in connection with the appended drawings, and wherein.

DETAILED DESCRIPTION OF EMBODIMENTS OF THE DISCLOSURE

Reference will now be made in detail to particular embodiments of the disclosure, it will be understood that the scope of the present invention is not limited to these embodiments. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, processes, components, and circuits have not been described in detail so as not to unnecessarily obscure aspects of the present invention.

Furthermore, it will be understood by one skilled in the art that attached drawings are to be regarded as illustrative, and may not be drawn to scale.

Also, it will be understood in the following description that the term "circuit" refers to a conductive loop consisting of at least one component or sub-circuit which are electrically coupled or electromagnetically coupled to each other. When one component/circuit is referred to as being "connected to" another component, or one component/circuit is referred to as being "connected between" two nodes, it can be connected to or coupled to another component directly or with an intermediate component therebetween. The connection of two components can be physical or logical connection, or physical and logical connection. On the contrary, when one component is referred to as being "coupled directly to" or "connected directly to" another component, there will be no an intermediate component between two components.

Where the term "comprising" or "including" is used in the present description and claims, it does not exclude other elements or steps, unless something otherwise is specifically stated. That is, it means "including, but not limited to".

In the following description that the terms such as "first", "second" and the like are used herein for purposes of description and are not intended to indicate or imply relative importance or significance. The term "plurality", as used herein, is defined as two or more than two, unless something otherwise is specifically stated.

Figure 1:
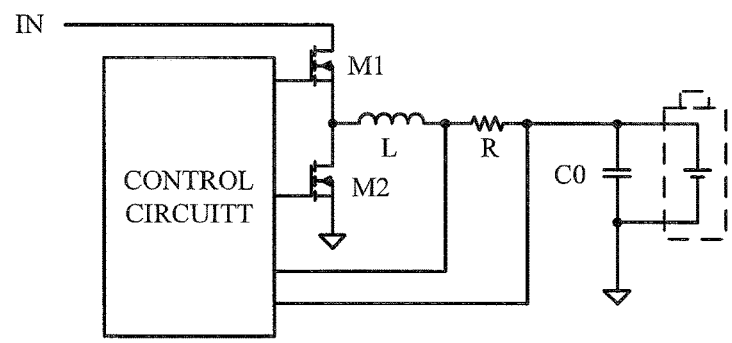
FIG. 1 is a schematic circuit diagram of an example switching power converter having an constant output current according to the prior art.
Figure 2:
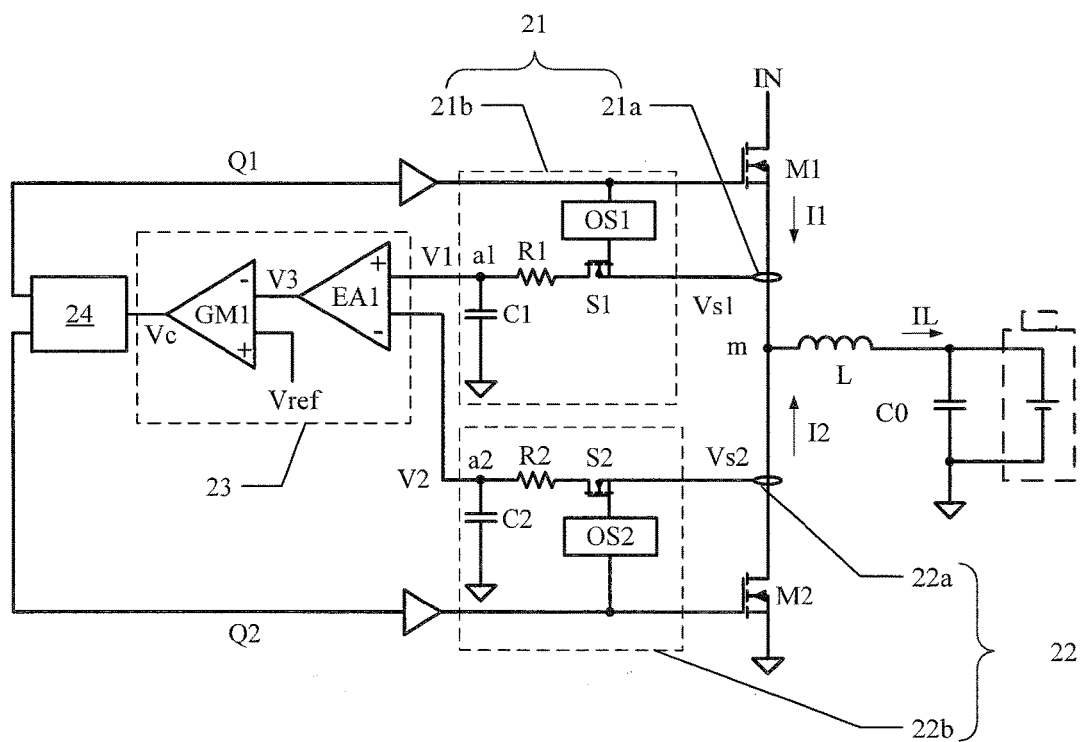
FIG. 2 is a schematic circuit diagram of an example switching power converter according to an embodiment of the present disclosure.

FIG. 2 is a schematic circuit diagram of an example switching power converter according to an embodiment of the present disclosure. As shown in FIG. 2, the switching power converter includes a power stage circuit and a control circuit. The power stage circuit has a buck-type topology, including a first power transistor M1, a second power transistor M2, an inductor L and an output capacitor C0. The first power transistor M1 has a first terminal being electrically coupled to an input terminal IN, and a second terminal being electrically coupled to an intermediate terminal m. The second power transistor M2 has a first terminal being electrically coupled to the ground, and a second terminal being electrically coupled to the intermediate terminal m. The inductor L is electrically coupled between the intermediate terminal m and an output terminal of the power stage circuit. The output capacitor C0 is electrically coupled between the output terminal of the power stage circuit and the ground. When the switching power converter is used as a charger for a rechargeable battery, the rechargeable battery may be regarded as a capacitance load so that the output capacitor C0 can be omitted. The first power transistor M1 and second power transistor M2 are controlled to be turned on and off alternatively by the control circuit. The inductor L stores and releases energy alternatively so that a constant output current is provided.

The control circuit includes a valley-value obtaining circuit 21, a peak-value obtaining circuit 22, a compensation signal generating circuit 23 and a control signal generating circuit 24.

The valley-value obtaining circuit 21 obtains a first voltage V1 representing a valley value of an electric current through the first power transistor M1.

The peak-value obtaining circuit 22 obtains a second voltage V2 representing a peak value of an electric current through the second power transistor.

Figure 3:
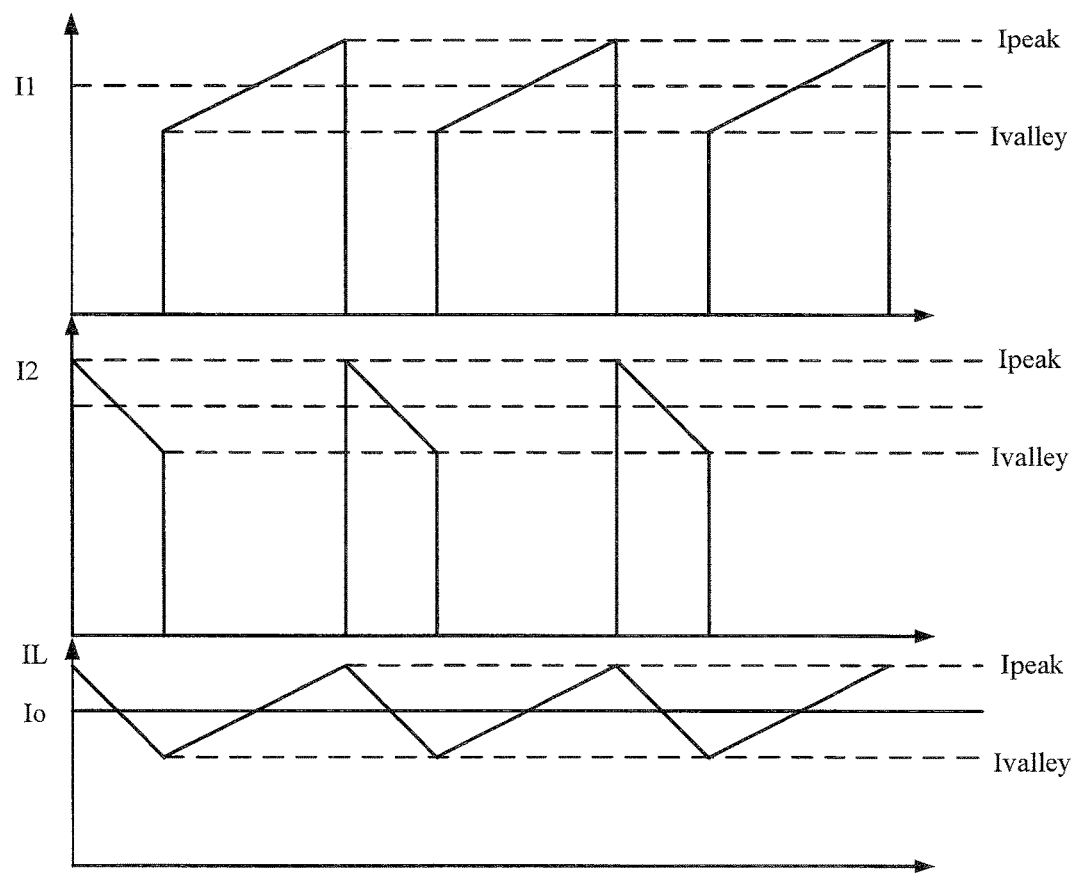
FIG. 3 is an operating waveform diagrams of an example switching power converter according to an embodiment of the present disclosure.

FIG. 3 is an operating waveform diagram of an example switching power converter according to an embodiment of the present disclosure. As shown in FIG. 3, in a time period during which the first power transistor M1 is turned on and the second power transistor is turned off, the inductor L stores energy and an inductor current IL flows from the input terminal IN to the output terminal through the first power transistor M1 and the inductor L. The inductor current IL increases continuously from the valley value to the peak value. In a time period during which the second power transistor M2 is turned on and the first power transistor M1 is turned off, the inductor L releases the stored energy and the inductor current IL flows from the ground to the output terminal through the second power transistor M2 and the inductor L. The inductor current IL decreases from the peak value to the valley value. Thus, the current through the first power transistor M1 is equal to the valley value of the inductor current IL in the switching cycle at the time when the first power transistor M1 changes from an off state to an on state. The current through the second power transistor M2 is equal to the peak value of the inductor current IL in the switching cycle at the time when the second power transistor M2 changes from an off state to an on state. Consequently, the peak value and valley value of the inductor current IL in one switching cycle can be obtained by sampling the current through the first power transistor M1 and the second power transistor M2. Meanwhile, because the inductor current IL increases and decreases approximately linearly, the average of the peak value and the valley value of the inductor current can represent the average of the inductor current, i.e. an output current value. In view of the above analysis, the valley-value obtaining circuit 21 and the peak-value obtaining circuit 22 obtain the first voltage V1 representing a valley value of the inductor current and the second voltage V2 representing a peak value of the inductor current respectively.

Specifically, the valley-value obtaining circuit 21 includes a first current detection circuit 21a and a first sampling circuit 21b.

The first current detection circuit 21a detects the current I1 through the first power transistor M1, and provides a first current detection signal Vs1. The first current detection signal Vs1 is in a first proportion to the current I1 through the first power transistor M1, wherein the first proportion is positive, that is, $Vs1 = I1 \cdot k1$, $k1 > 0$.

Figure 4:
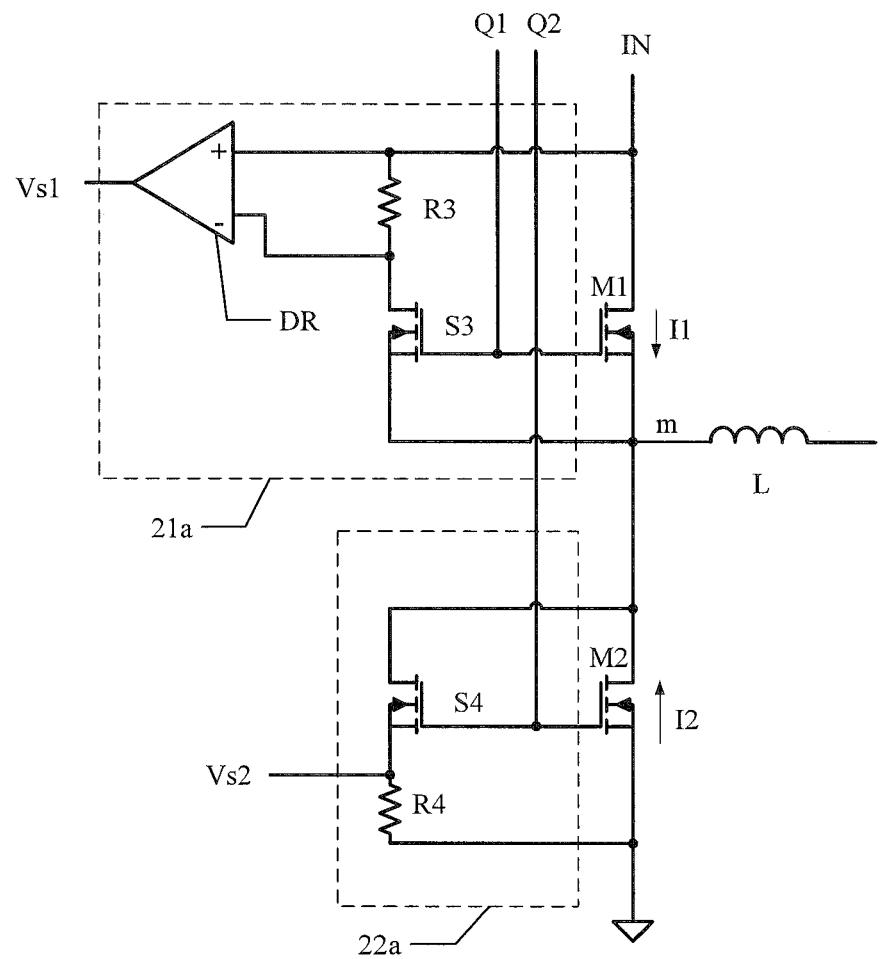
FIG. 4 is a schematic circuit diagrams of an example first current detection circuit and an example second current detection circuit according to an embodiment of the present disclosure.

FIG. 4 is a schematic circuit diagram of an example current detection circuit according to an embodiment of the present disclosure. As shown in FIG. 4, the first current detection circuit 21a includes a third resistor R3, a third switch S3 and a voltage-drop obtaining circuit DR.

The third resistor R3 and third switch S3 are electrically coupled in series between a first terminal and second terminal of the first power transistor M1. The third switch S3 can be controlled by a first control signal Q1, and turned on and off together with the first power transistor M1. The third switch S3 can be a transistor or any of other controllable switching components.

Thus, when the first power transistor M1 is turned on, the third switch S3 is also turned on. The first power transistor M1 has a voltage drop while turning on, and the turn-on voltage drop is proportional to the current through the first power transistor M1. The voltage drop across the series circuit including the third resistor R3 and the third switch S3 is equal to the turn-on voltage drop. Meanwhile, the third resistor R3 has a resistance value much larger than the turn-on resistor of the third switch S3, so that the voltage drop across the third resistor R3 is approximately equal to the turned-on voltage drop of the first power transistor M1. That is, the voltage drop across the third resistor R3 can represent the current through the first power transistor M1.

The voltage-drop obtaining circuit DR samples and outputs a voltage across the third resistor R3 as the first current detection signal Vs1. The voltage-drop obtaining circuit may either include a differential amplifier having input terminals being connected with both terminals of the third resistor R3, or include a current-mirror for amplifying the current through the third resistor and then sampling. It can be understood that any prior circuits for sampling and outputting the voltage across the third resistor R3 can be applicable to the embodiment of the disclosure.

The first sampling circuit 21b samples the first current detection signal Vs1 according to the first control signal Q1 and provides the first voltage V1. Specifically, the first sampling circuit 21b samples the first current detection signal Vs1 to obtain the first voltage V1 representing a valley value of the inductor current in a case that the first control signal Q1 changes from an inactive level to an active level.

In this embodiment, the active level of the control signal means a level for turning on the corresponding power transistor, and the inactive level of the control signal means a level for turning off the corresponding power transistor.

It should be understood that the switching power converter is asynchronous rectifying converter and the first control signal Q1 and second control signal Q2 are complementary signals according to the embodiment, which means the first power transistor M1 and the second power transistor M2 are turned on and off alternatively, so that the sampling of the first current detection signal Vs1 can be achieved when the second control signal Q2 changes from an active level to an inactive level.

Preferably, the first sampling circuit 21b includes a first single-trigger circuit OS1, a first switch S1, a first resistor R1 and a first capacitor C1.

The control signal Q1 changes from an inactive level to an active level simultaneously when the second control signal Q2 changes from an active level to an inactive level. That is, the first single-trigger circuit OS1 is used to provide a first single-trigger signal when the first power transistor M1 changes from an off state to an on state.

The first switch S1 and the first resistor R1 are electrically coupled in series between the first current detection circuit 21a and an output terminal a1 of the first voltage. The first switch S1 is turned on in accordance with the first single-trigger signal.

The first capacitor C1 is connected between an output terminal a1 of the first signal and the ground, and maintains the first voltage V1.

The first single-trigger signal is a pulse signal generated when the first power transistor M1 changes from an off state to an on state. The first single-trigger signal controls the first switch S1 to be turned on for a short time period, during which the first current detection signal Vs1 charges the first capacitor C1 through the first resistor R1 so that the first capacitor C1 has a voltage equal to an instantaneous value of the first current detection signal Vs1 at the time. That means the first capacitor C1 is used for maintaining the valley value of the first current detection signal Vs1 after sampling. The first resistor R1 damps a fast jump of the voltage and suppresses interference, and may have a small resistance value.

Figure 5:
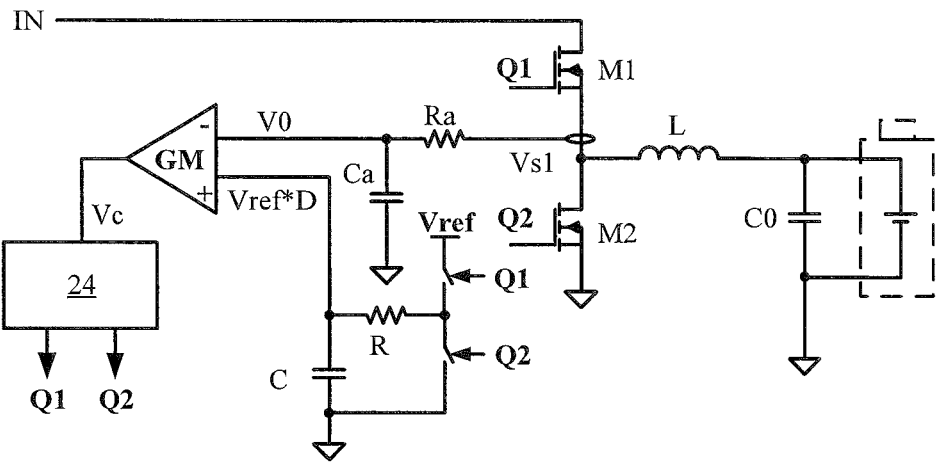
FIG. 5 is a schematic circuit diagram of an example switching power converter having an constant output current in a comparative example.

FIG. 5 is a schematic circuit diagram of an example switching power converter having a constant output current in a comparative example. As shown in FIG. 5, the control circuit samples the current through the first power transistor M1 and obtains a first current detection signal Vs1, averages the first current detection signal Vs1 by a RC circuit consisting of a resistor Ra and a capacitor Ca, and obtains a parameter V0 representing the average current through the first power transistor M1. The control circuit then produces a compensation signal in accordance with the parameter V0 and a product Vref*D of the reference voltage Vref and the duty cycle D. In the control circuit of the comparative example as shown in FIG. 5, the RC circuit outputs the average value of the first current detection signal vs1. Consequently, the resistor and capacitor both need have large values. In contrast, although the first resistor R1 and the first capacitor C1 are also formed as a RC circuit, it is used for sampling and maintaining a voltage. Thus, the first resistor R1 has a resistance value much smaller than that of the resistor Ra in FIG. 5, and the first capacitor C1 has a capacitance value much smaller than that of the capacitor Ca in FIG. 5, which improves integration level of the circuit and reduces design difficulties.

Correspondingly, the valley-value obtaining circuit 22 includes a second current detection circuit 22a and a second sampling circuit 22b.

The second current detection circuit 22a detects the current I2 through the second power transistor M2, and provides a second current detection signal Vs2. The current I2 flows from the ground to the inductor L through the second power transistor M2. When the voltage signal is used as the second current detection signal Vs2, the second current detection signal Vs2 is in a second proportion −k1 to the current through the second power transistor M2. That is, the Vs2 is equal to I2*(−k1). The first proportion k1 and the second proportion −k1 have the same absolute value. It should be understood that the relationship of the proportions is not necessary. The first proportion and second proportion maybe changed to have different absolute values by adjusting the various parameters of the relevant components, such as an amplification factor, but the circuit also has the same function.

In a preferable embodiment, the second current detection circuit 22a includes a fourth resistor R4 and a fourth switch S4 as shown in FIG. 4. The fourth resistor R4 and fourth switch S4 are electrically coupled in series between the first terminal and second terminal of the second power transistor M2. The fourth switch S4 can be controlled by a second control signal Q2, and turned on and off together with the second power transistor M2.

Thus, when the second power transistor M2 is turned on, the fourth switch S4 is also turned on. The second power transistor M2 has a voltage drop while turning on, and the turn-on voltage drop is proportional to the current through the second power transistor M2. The voltage drop across the series circuit including the fourth resistor R4 and the fourth switch S4 is equal to the turn-on voltage drop. Meanwhile, the fourth resistor R4 has a resistance value much larger than the turn-on resistor of the fourth switch S4, so that the voltage drop across the fourth resistor R4 is approximately equal to the turned-on voltage drop of the second power transistor M2. The fourth resistor R4 has a terminal being grounded directly or through the fourth switch S4, so that the terminal of the fourth resistor R4 far away from the ground provides a voltage which can be used as the second current detection signal Vs2 directly. That is, the one terminal of the resistor R4 has a voltage representing the current through the second power transistor M2.

Because the current flows from the ground to the intermediate terminal m of the power stage circuit, the second current detection signal Vs2 is a negative voltage. As mentioned above, the Vs2 is in the second proportion −k1 to the current through the second power transistor M2.

The sampling of the current can be achieved by the sampling circuit as shown in FIG. 4, without the need for a resistor in the current path of the power stage circuit. Thus, the circuit loss is not increased while outputting relatively high current.

The second sampling circuit 22b samples the second current detection signal Vs2 in accordance with the first control signal Q1 or the second control signal Q2, and provides a second voltage V2.

The second sampling circuit 22b samples the second current detection signal Vs2 to obtain the second voltage V2 representing a peak value of the inductor current in a case that the first control signal Q2 changes from an inactive level to an active level.

It should be understood that the switching power converter is a synchronous rectifying converter and the first control signal Q1 and second control signal Q2 are complementary signals, that is, the first power transistor M1 and the second power transistor M2 are turned on and off alternatively, so that the sampling of the second current detection signal Vs2 can be achieved when the first control signal Q1 changes from an active level to an inactive level.

Preferably, the second sampling circuit 22b includes a second single-trigger circuit OS2, a second switch S2, a second resistor R2 and a second capacitor C2.

The control signal Q1 changes from an active level to an inactive level simultaneously when the second control signal Q2 changes from an inactive level to an active level. That is, the second single-trigger circuit OS2 is used to provide a second single-trigger signal when the second power transistor M2 changes from an off state to an on state.

The second switch S2 and the second resistor R2 are electrically coupled in series between the second current detection circuit 22a and an output terminal a2 of the second voltage. The second switch S2 is turned on in accordance with the second single-trigger signal.

The second capacitor C2 is connected between an output terminal a2 of the second signal and the ground, and used for maintaining the first voltage V1.

The second single-trigger signal is a pulse signal generated when The second power transistor M2 changes from an off state to an on state. The second single-trigger signal controls the second switch S2 to be turned on for a short time period, during which the second current detection signal Vs2 charges the second capacitor C2 through the second resistor R2, so that the second capacitor C2 has a voltage equal to an instantaneous value of the second current detection signal Vs2 at the time. That means the second capacitor C2 maintains the peak value of the second current detection signal Vs2 for sampling. The second resistor R2 damps a fast jump of the voltage and suppresses interference, and may have a small resistance value.

Similar with the first sampling circuit 21b, although the second resistor R2 and the second capacitor C2 are also formed as a RC circuit, it is used for sampling and maintaining a voltage. Thus, the second resistor R2 has a resistance value much smaller than that of the resistor in FIG. 5, and the second capacitor C2 has a capacitance value much smaller than that of the capacitor in FIG. 5, which improves integration level of the circuit and reduces design difficulties.

The compensation signal generating circuit 23 generates a compensation signal Vc in accordance with the first voltage V1, the second voltage V2 and the reference voltage Vref. The compensation signal Vc represents the difference of the desirable inductor current Iref and the average of the peak value Ipeak and the valley value Ivalley of the inductor current.

That is, $Vc=k*[Iref-(Ipeak+Ivalley)/2]$.

In the embodiment, the compensation signal generating circuit 23 includes an error amplifier EA1 and a transconductance amplifier GM1.

The error amplifier EA1 receives the first voltage V1 and the second voltage V2 and provides a third voltage V3 representing a sum of a peak value and a valley value of an inductor current. As shown in FIG. 2, the error amplifier has a non-inverting terminal being connected with the output terminal a1 of the first voltage, an inverting terminal being connected with the output terminal a2 of the second voltage. The error amplifier EA1 provides a signal proportional to the difference of the first voltage V1 and the second voltage V2.

The first voltage V1 is in the first proportion k1 to the valley value Ivalley of the inductor current, the second voltage V2 is in the second proportion −k1 to the peak value Ipeak of the inductor current, in which k1 is positive. Thus, the error amplifier EA1 provides a signal proportional to the sum of the peak value and valley value of the inductor current. The third voltage V3 can represent the average of the sum of the peak value and valley value of the inductor current by adjusting amplification factor of the error amplifier EA1. Thus, the third voltage V3 can be compared with the reference voltage Vref.

The transconductance amplifier GM1 receives the reference voltage Vref and the third voltage V3, and provides the compensation signal Vc.

The control signal generating circuit 24 generates a first control signal Q1 and a second control signal Q2 in accordance with the compensation signal Vc.

Specifically, when the third voltage $V3=k1(Ipeak+Ivalley)/2$ is smaller than the reference voltage Vref, the circuit provides a relatively small current and the compensation signal Vc will increase. Correspondingly, the control signal generating circuit 24 increases the duty cycle of the first control signal Q1 so that the output current from the circuit will increase. When the third voltage V3 is larger than the reference voltage Vref, the circuit provides a relatively large current and the compensation signal Vc will decrease. Correspondingly, the control signal generating circuit 24 decreases the duty cycle of the first control signal Q1 so that the output current from the circuit will decrease. Thus, the output current from the circuit is controlled to be stable.

Figure 6:
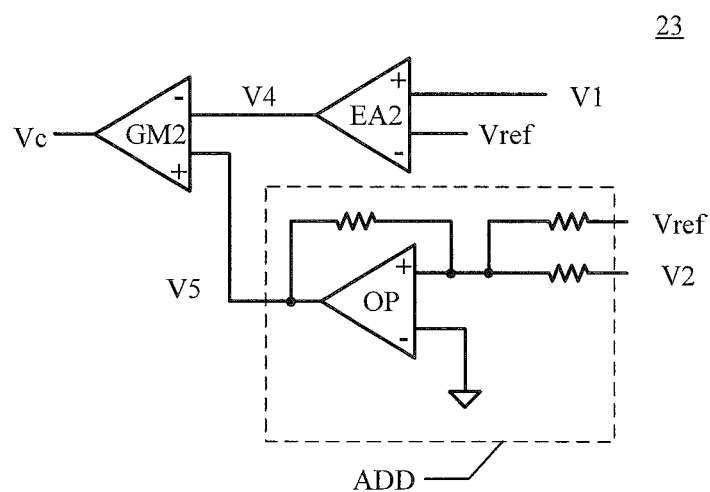
FIG. 6 is a schematic circuit diagram of an alternative compensation signal generating circuit according to a first embodiment of the present disclosure.

The compensation signal generating circuit 23 may have alternatives with the same function. FIG. 6 is a schematic circuit diagram of an alternative compensation signal generating circuit 23 according to an embodiment of the present disclosure. As shown in FIG. 6, the compensation signal generating circuit 23 includes an error amplifier EA2, an adder ADD and a transconductance amplifier GM2.

The error amplifier EA2 receives the reference voltage Vref and the first voltage V1, and provides a fourth voltage V4. Thus, the fourth voltage V4 is in proportion to the difference of the first voltage V1 and the reference voltage Vref. Furthermore, the fourth voltage V4 represents the difference of the valley value of the inductor current and the desirable output current.

The adder ADD receives the reference voltage Vref and the second voltage V2, and provides a fifth voltage V5. Thus, the fifth voltage V5 is in proportion to a sum (Vref+V2) of the reference voltage Vref and the second voltage V2. The second voltage V2 represents a negative peak value of the inductor current. Thus, the fifth voltage V5 represents the difference of the desirable output current and the valley value of the inductor current.

The adder ADD may either be implemented as the circuit structure including a resistor and an ideal operational amplifier as shown in FIG. 6, or as other suitable circuit structures.

The transconductance amplifier GM2 receives the fourth voltage V4 and the fifth voltage V5, and provides the compensation signal Vc. The compensation signal Vc can represent the difference of the fifth voltage V5 and fourth voltage V4, i.e. $(Vref+V2)-(V1-Vref)=2Vref-(V1-V2)$. The compensation signal Vc can represent the difference of the desirable output current and the average of the peak value and the valley value of the inductor current.

It should be understood that although the error amplifier, the operational amplifier and transconductance amplifier of the compensation signal generating circuit 23 have the non-inverting terminals and the inverting terminals, which are electrically coupled in the specific connection relationships as shown in FIG. 2 and FIG. 6, the connection relationships of the input terminals of one or several components can be exchanged to achieve the required function if necessary. For example, the circuit can have the same function if exchanging the connection relationship of the input terminals of the transconductance amplifier, the same of the operational amplifier and the same of error amplifier EA1 of the adder ADD. This modification can be easily made within the spirit and scope of the present disclosure.

The control circuit according to the embodiment may be included an integrated circuit together with a first power transistor M1 and a second power transistor M2. A switching power converter having a constant output current may be formed based on the integrated circuit, as a charger for rechargeable batteries, with only the need for several electronic components. Meanwhile, the switching power converter and the control circuit according to the embodiment need no sampling resistor coupled to the inductor, so that the pins of the integrated circuit are reduced. Moreover, the integrated circuit can be much easily miniaturized, because the control circuit doesn't need resistors having large resistance value and capacitors having large capacitance value.

The control circuit samples a valley value of an electric current through the first power transistor of the power stage circuit and a peak value of an electric current through the second power transistor of the power stage circuit, and obtains the parameters of the output current in accordance with the average value of the valley value and peak value. Thus, the constant-current control can be performed by sampling electric current through the first power transistor and the second power transistor. Moreover, the switching power converter simplifies a current feedback loop for outputting a constant current, and the integrated circuit has fewer pins.

Figure 7:
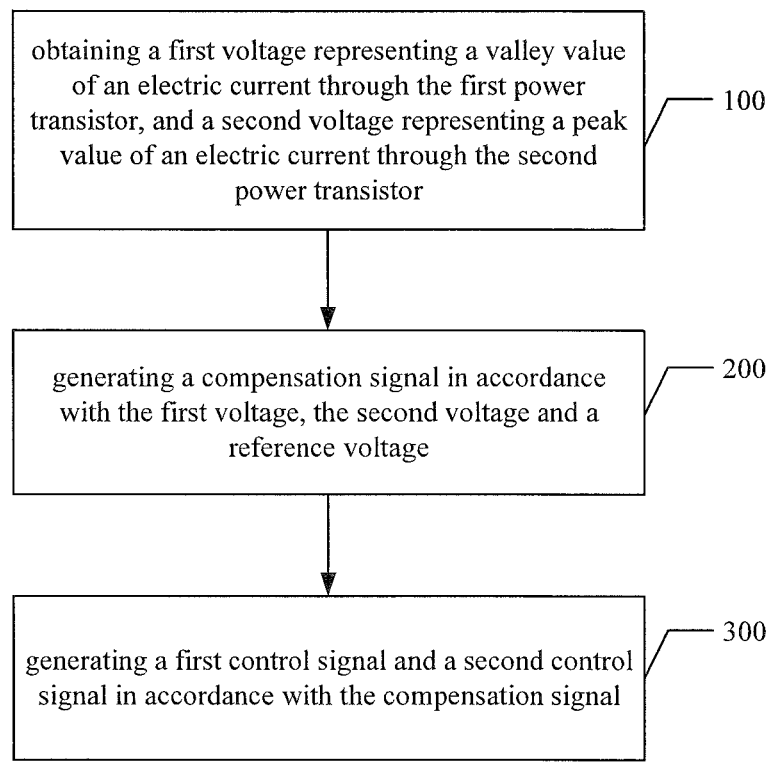
FIG. 7 is a flow chart of an example constant-current control method according to a second embodiment of the present disclosure.

FIG. 7 is a flow chart of an example constant-current control method according to a second embodiment of the present disclosure. As shown in FIG. 7, the method comprises the following steps.

At step 100, a first voltage representing a valley value of an electric current through the first power transistor, and a second voltage representing a peak value of an electric current through the second power transistor, are obtained.

Preferably, the first voltage is in a first proportion to valley value of an electric current through the first power transistor, and the second voltage is in a second proportion to peak value of an electric current through the second power transistor, and the first proportion and the second proportion have a positive value and a negative value respectively, but have the same absolute value.

At step 200, a compensation signal representing a difference between a desirable inductor current and average value of a peak value and a valley value of an inductor current is generated in accordance with the first voltage, the second voltage and the reference voltage.

The step of generating the compensation signal in accordance with the first voltage, the second voltage and the reference voltage includes generating a signal proportional to Vref−(V1−V2)/2 as the compensation signal, in which Vref is the reference voltage, V1 is the first voltage and V2 is the second voltage.

At step 300, a first control signal for controlling the first power transistor and a second control signal for controlling the second power transistor are generated in accordance with the compensation signal.

The control circuit samples a valley value of an electric current through the first power transistor of the power stage circuit and a peak value of an electric current through the second power transistor of the power stage circuit, and obtains parameters of the output current on basis of the average value of the valley value and peak value. Thus, the constant-current control can be performed by sampling electric current through the first power transistor and the second power transistor. Moreover, the switching power converter simplifies a current feedback loop for outputting a constant current, and the integrated circuit has fewer pins.

The foregoing descriptions of specific embodiments of the present invention have been presented, but are not intended to limit the invention to the precise forms disclosed. It will be readily apparent to one skilled in the art that many modifications and changes may be made in the present invention. Any modifications, equivalence, variations of the preferred embodiments can be made without departing from the doctrine and spirit of the present invention.

What is claimed is:

1. A control circuit configured to control a power stage circuit comprising a first power transistor, a second power transistor and an inductor, comprising:
   a valley-value obtaining circuit configured to obtain a first voltage representing a valley value of an electric current through said first power transistor;
   a peak-value obtaining circuit configured to obtain a second voltage representing a peak value of an electric current through said second power transistor;
   a compensation signal generating circuit configured to generate a compensation signal representing a difference between a desirable inductor current and an average value of a peak value and a valley value of an inductor current in accordance with said first voltage, said second voltage and a reference voltage; and
   a control signal generating circuit configured to generate a first control signal for controlling said first power transistor and a second control signal for controlling said second power transistor in accordance with said compensation signal.

2. The control circuit according to claim 1, wherein said first voltage is in a first proportion to said valley value of said electric current through said first power transistor, and said second voltage is in a second proportion to said peak value of said electric current through said second power transistor, and said first proportion and said second proportion have a positive value and a negative value respectively, but have the same absolute value;
   said compensation signal generating circuit generates a signal proportional to Vref−(V1−V2)/2 as said compensation signal, in which Vref is said reference voltage, V1 is said first voltage and V2 is said second voltage.

3. The control circuit according to claim 2, wherein said valley-value obtaining circuit comprises:
   a first current detection circuit configured to detect said electric current through said first power transistor and to provide a first current detection signal which is in said first proportion to said electric current through said first power transistor;
   a first sampling circuit configured to sample said first current detection signal in accordance with said first control signal or said second control signal and to provide said first voltage;
   said peak-value obtaining circuit comprises:
   a second current detection circuit configured to detect said electric current through said second power transistor and to provide a second current detection signal which is in said second proportion to said electric current through said second power transistor;
a second sampling circuit configured to sample said second current detection signal in accordance with said first control signal or said second control signal and to provide said second voltage.

4. The control circuit according to claim 3, wherein said first sampling circuit comprises:
a first single-trigger circuit configured to provide a first single-trigger signal in a case that said first control signal changes from an inactive level to an active level or in a case that said second control signal changes from an active level to an inactive level;
a first switch and a first resistor, which are electrically coupled in series between said first current detection circuit and an output terminal of said first voltage, in which said first switch is turned on in accordance with said first single-trigger signal; and
a first capacitor being electrically coupled between an output terminal of said first signal and ground, and being configured to maintain said first voltage;
said second sampling circuit comprises:
a second single-trigger circuit configured to provide a second single-trigger signal in a case that said first control signal changes from an active level to an inactive level or in a case that said second control signal changes from an inactive level to an active level;
a second switch and a second resistor, which are electrically coupled in series between said second current detection circuit and an output terminal of said second voltage, in which said second switch is turned on in accordance with said second single-trigger signal; and
a second capacitor being electrically coupled between an output terminal of said second signal and ground, and being configured to maintain said second voltage.

5. The control circuit according to claim 3, wherein said first current detection circuit comprises:
a third resistor and a third switch, which are electrically coupled in series between a first terminal and a second terminal of said first power transistor, and said third switch and said first power transistor being turned on or off simultaneously; and
a voltage-drop obtaining circuit configured to sample and output a voltage across said third resistor as said first current detection signal;
said second current detection circuit comprises:
a fourth resistor and a fourth switch, which are electrically coupled in series between a first terminal and a second terminal of said second power transistor, and said fourth switch and said second power transistor being turned on or off simultaneously.

6. The control circuit according to claim 2, wherein said compensation signal generating circuit comprises:
an error amplifier configured to receive said first voltage and said second voltage, and to provide a third voltage representing an average value of a peak value and a valley value of an inductor current; and
a transconductance amplifier configured to receive said reference voltage and said third voltage, and to provide said compensation signal.

7. The control circuit according to claim 2, wherein said compensation signal generating circuit comprises:
an error amplifier configured to receive said reference voltage and said first voltage, and to provide a fourth voltage;
an adder configured to receive said reference voltage and said second voltage, and to provide a fifth voltage; and
a transconductance amplifier configured to receive said fourth voltage and said fifth voltage, and to provide said compensation signal.

8. An integrated circuit, comprising:
a first power transistor;
a second power transistor; and
a control circuit according to claim 1, and being configured to control said first power transistor and said second power transistor.

9. A switching power converter, comprising:
a power stage circuit comprising a first power transistor, a second power transistor and an inductor; and
a control circuit according to claim 1 and configured to control said power stage circuit.

10. A constant-current control method for controlling a power stage circuit comprising a first power transistor, a second power transistor and an inductor, comprising:
obtaining a first voltage representing a valley value of an electric current through said first power transistor, and a second voltage representing a peak value of an electric current through said second power transistor;
generating a compensation signal representing a difference between a desirable inductor current and an average value of a peak value and a valley value of an inductor current in accordance with said first voltage, said second voltage and a reference voltage;
generating a first control signal for controlling said first power transistor and a second control signal for controlling said second power transistor in accordance with said compensation signal.

11. The constant-current control method according to claim 10, wherein said first voltage is in a first proportion to said valley value of said electric current through said first power transistor, and said second voltage is in a second proportion to said peak value of said electric current through said second power transistor, and said first proportion and said second proportion have a positive value and a negative value respectively, but have the same absolute value;
said step of generating said compensation signal in accordance with said first voltage, said second voltage and said reference voltage comprises generating a signal proportional to Vref−(V1−V2)/2 as said compensation signal, in which Vref is said reference voltage, V1 is said first voltage and V2 is said second voltage.

* * * * *